US008625783B2

(12) United States Patent
Maggenti

(10) Patent No.: US 8,625,783 B2
(45) Date of Patent: *Jan. 7, 2014

(54) METHOD AND APPARATUS FOR PROVIDING PRIVACY OF USER IDENTITY AND CHARACTERISTICS IN A COMMUNICATION SYSTEM

(75) Inventor: Mark Anthony Maggenti, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1686 days.

This patent is subject to a terminal disclaimer.

(21) Appl. No.: 11/552,267

(22) Filed: Oct. 24, 2006

(65) Prior Publication Data

US 2007/0053511 A1     Mar. 8, 2007

Related U.S. Application Data

(63) Continuation of application No. 11/265,846, filed on Nov. 2, 2005, now Pat. No. 7,143,293, which is a continuation of application No. 09/981,449, filed on Oct. 16, 2001, now Pat. No. 6,983,376.

(51) Int. Cl.
*H04L 9/30* (2006.01)
(52) U.S. Cl.
USPC ............. 380/30; 713/165; 713/171; 713/172
(58) Field of Classification Search
USPC ......................................... 713/165, 171, 172
See application file for complete search history.

(56) References Cited

U.S. PATENT DOCUMENTS

| 5,034,997 | A | 7/1991 | Iwasaki |
| 5,585,953 | A | 12/1996 | Zavrel |
| 5,751,813 | A | 5/1998 | Dorenbos |
| 5,850,444 | A * | 12/1998 | Rune .............................. 705/79 |
| 5,864,546 | A | 1/1999 | Campanella |
| 5,889,861 | A * | 3/1999 | Ohashi et al. ................. 380/247 |
| 5,946,120 | A | 8/1999 | Chen |
| 6,292,895 | B1 | 9/2001 | Baltzley |
| 6,983,376 | B2 | 1/2006 | Maggenti |
| 7,143,293 | B2 | 11/2006 | Maggenti |
| 7,197,017 | B1 | 3/2007 | Rezaiifar et al. |

FOREIGN PATENT DOCUMENTS

| EP | 0982958 A2 | 1/2000 |
| EP | 0903887 B1 | 6/2004 |
| JP | 5328429 A | 12/1993 |
| JP | 8195741 A | 7/1996 |
| JP | 2001285921 A | 10/2001 |
| KR | 20000017574 A | 3/2000 |

OTHER PUBLICATIONS

International Search Report-PCT/US02/032564, International search Authority-European Patent Office, May 26, 2003.

* cited by examiner

*Primary Examiner* — Kaveh Abrishamkar
(74) *Attorney, Agent, or Firm* — Won Tae Kim

(57) ABSTRACT

A methods and apparatus for providing privacy of user identity and characteristics in a communication system. A public key and a private key is generated, corresponding to a transceiver. The public key is transmitted to a wireless communication device. The wireless communication device encrypts one or more an initial messages using the public key and transmits the one or more encrypted initial messages to the transceiver. The transceiver receives the one or more encrypted initial messages and decrypts it using the private key. The transceiver may then allocate resources to initiate a desired communication between said wireless communication device and a second communication device.

20 Claims, 3 Drawing Sheets

METHOD AND APPARATUS FOR PROVIDING PRIVACY OF USER IDENTITY AND CHARACTERISTICS IN A COMMUNICATION SYSTEM

CLAIM OF PRIORITY UNDER 35 U.S.C §120

The present Application for Patent is continuation of patent application Ser. No. 09/981,449 entitled "METHOD AND APPARATUS FOR PROVIDING PRIVACY OF USER IDENTITY AND CHARACTERISTICS IN A COMMUNICATION SYSTEM" filed Oct. 16, 2001, pending, and assigned to the assignee hereof and hereby expressly incorporated by reference herein.

BACKGROUND

1. Field

The present invention relates generally to communication systems. More particularly, this invention relates to a system and method for providing privacy of user identity and characteristics in a communication system.

2. Background

Recently, there has become a need in the telecommunications industry to provide secure communications in both wireless and wireline communication systems. With the advent of wireless telephony, the ability to provide secure communications have become even more important, due to the ubiquitous nature of electromagnetic signals.

In prior art communication systems, a first wireless communication device, such as a cellular telephone, may initiate communications with a second wireless communication device. Communications between the two wireless communication devices are generally accomplished using a fixed transceiver, commonly referred to as a base station. When the first wireless communication device initiates communications with the second wireless communication device, it does so by transmitting one ore more initial message(s) typically contains various information, such as an identification of the first wireless communication device (a mobile identification number (MIN), an electronic serial number (ESN), an international mobile subscriber identification (IMSI) number, etc), position-related information of the wireless communication device, an identification of the second wireless communication device, the type of communications desired (for example, secure voice, secure data, clear voice, clear data), and so on.

In many instances, it may not be desirable to allow the information contained in the initial message(s) to be received by an unauthorized recipient. For example, it may be desirable to keep a user's identity secret during all portions of a wireless communication, including the transmission of one or more initial messages.

One method for protecting a user's identity during transmission of an initial message(s) involves the use of a temporary user identification code, sometimes referred to as a Temporary Mobile Subscriber Identity, or (TMSI), to protect a device's identification code, such as an IMSI. In this case, a user transmits one or more initial messages, including the IMSI, and is then provided a TMSI for use during subsequent communications. The TMSI is usually transmitted over an encrypted channel to the requesting communication device, so that an unauthorized recipient cannot intercept it. The TMSI is then used in subsequent communications to identify the communication device.

The disadvantage of the security method described above, of course, is that the first wireless communication device must at least one time send the IMSI, or other identifier, over the air for anyone to intercept. This means that the identifier and/or a number of informational items, such as a wireless communication device identification number, position-related information, etc., may be compromised, thus jeopardizing the security or anonymity of the first and/or possible second wireless communication devices.

That is needed is a method and apparatus for initiating secure communications, by a wireless communication device without compromising a user's identity and other characteristics normally transmitted during a request to initiate communications, while still allowing the fixed transceiver to determine the identity and other characteristics.

SUMMARY

The present invention is directed to a method and apparatus for providing privacy of user identity and characteristics in a communication system. In one embodiment, the present invention is directed to an apparatus, the apparatus comprising a processor for generating a public key and a private key associated with a transceiver. The public key is transmitted to a communication device. The communication device encrypts one or more initial messages using the public key when the it is desired to maintain secrecy of the apparatus' identification code or other characteristics. The encrypted initial message(s) is transmitted by the communication device to the transceiver, where it is decrypted using the private key. A processor then allocates resources for establishing the requested service device for the communication device.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

The present invention is directed to a method and apparatus for providing privacy of user identity and characteristics in a communication system. Although the method and apparatus is described herein with respect to a wireless terrestrial telephone system, it should be understood that the method and apparatus for providing privacy of user identity and characteristics could be applied to a number of other situations. For example, the method and apparatus could alternatively be used in a satellite communication system, or in a wireline communication system, such as a Public Switched Telephone Network (PSTN). In addition, the method and apparatus could be used in other types of electronic devices other than telephones, such as facsimile machines, Personal Digital Assistants (PDAs), wireless data modems, etc.

Figure 1:
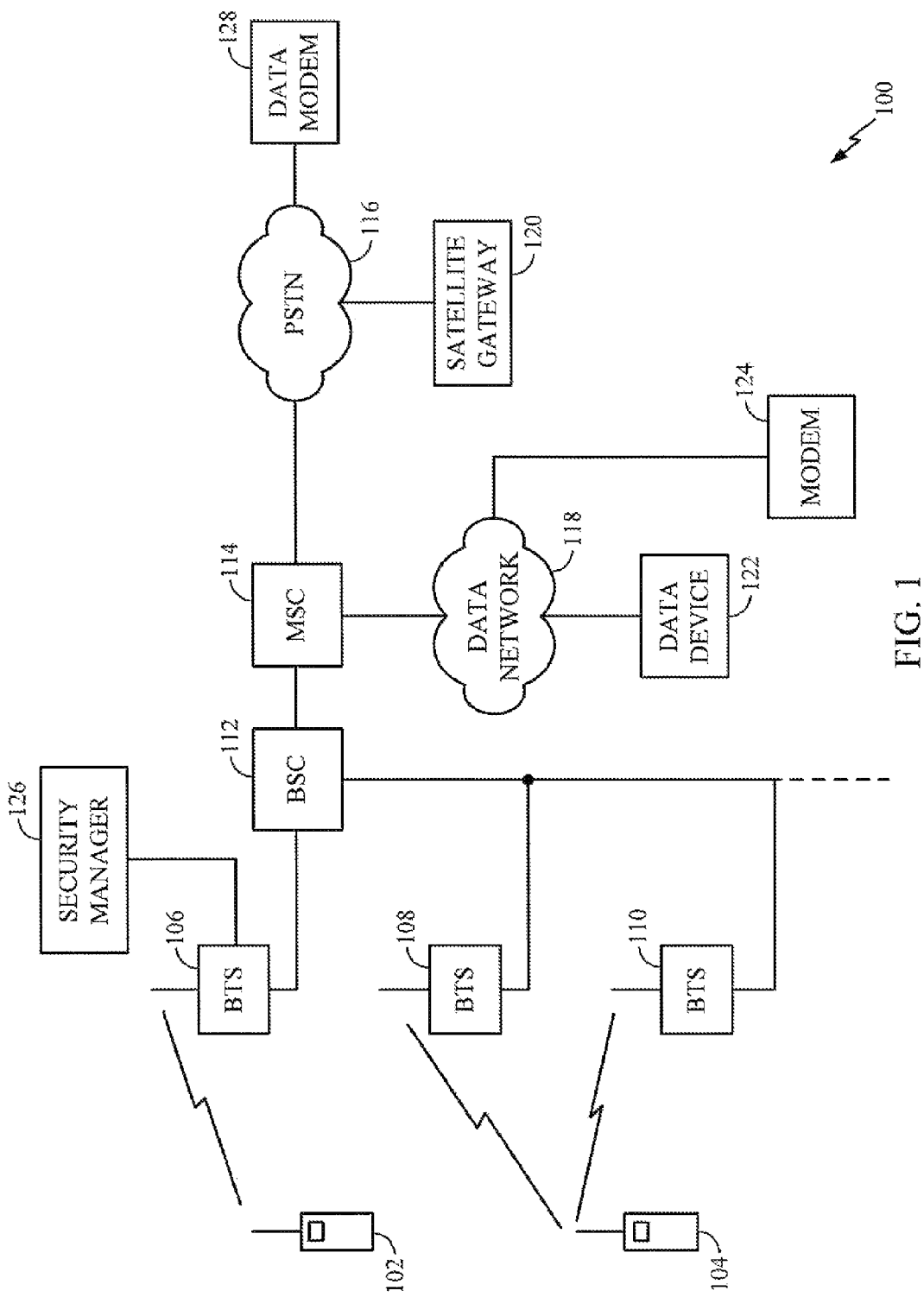
FIG. 1 illustrates a wireless terrestrial communication system in which various embodiments of the present invention are incorporated.

FIG. 1 illustrates a wireless terrestrial communication system 100 in which various embodiments of the present invention are incorporated. Wireless communication devices (WCDs) 102 and 104 communicate with fixed transceivers, otherwise known as basestation transceivers (BTSs) 106, 108, and/or 110, or simply transceivers, wirelessly using one or more well-known air-interfaces, such as code division multiple access (CDMA), time division multiple access (TDMA), global system for mobile communications (GSM), or others. The term "transceiver" used herein refers to any fixed or mobile transceiver, such as a satellite, mobile base station, or transceiver mounted in a moving vehicle. WCDs 102 and 104 are shown in FIG. 1 comprising cellular telephones, although it should be understood that WCDs 102 and 104 could alternatively comprises a variety of electronic devices, as noted above.

Communications to and from WCDs may be routed to devices outside communication system 100 (such as telephones or data modems) by way of mobile switching center (MSC) 114. MSC 114 routes communications to these other devices either through public switched telephone network (PSTN) 116 or through data network 118. Satellite gateway 120 is used to connect satellite devices, such as telephones or data modems, generally to PSTN 116. The information is subsequently received by data device 122 or modem 124, as the case may be. Data modem 128 is connected to PSTN 116 to enable computers, digital telephones, and other data devices, to communicate over PSTN 116.

The various communication devices comprising communication system 100, such as WCDs, data devices, and modems, may be capable of transmitting and receiving "secure" voice and/or data. In general, this means that communication signals transmitted from WCDs 102 and 104 are encoded, or encrypted, using one or more well-known techniques. Communication signals received from BTS 106, for example, arrive at WCD 102 in encrypted form, and are decrypted using similar well-known techniques.

One method of performing secure communications is known as public-key cryptography. Public-key cryptography is based on the concept of a key pair. Each half of the pair (one key) can encrypt information so that only the other half (the other key) can decrypt it. One part of the key pair, the private key, is known only by the designated owner; the other part, the public key, is published widely but is still associated with the owner. Key pairs have a unique feature—data encrypted with one key can be decrypted with the other key in the pair. In other words, it makes no difference if you use the private key or public key to encrypt a message, the recipient can use the other key to decrypt it. These keys can be used in different ways to provide message confidentiality and to prove the authenticity of a message's originator. In the first case, one would use the recipient's public key to encrypt a message; in the other, one would use a private key to encrypt a message.

In one embodiment, communication system 100 uses public-key cryptography to provide secure communications between WCDs and other communication devices in communication system 100. Of course, other known encryption systems could be used in the alternative to public-key cryptography. In this embodiment, a public key and a corresponding private key are generated at one or more predetermined times and stored in a database. The generation of the key pair can take place at any BTS, at MSC 114, at a data device connected to data network 118, satellite gateway 120, or PSTN 116. Once generated, the keys can be stored in a database located at any of the aforementioned entities. In another embodiment, key generation, storage, and management could be done at a secure server, shown in FIG. 1 as security manager 126. Although FIG. 1 depicts security manager 126 as being located proximate to BTS 106, it should be understood that it could alternatively be located within BTS 106, or in any one of the aforementioned entities such as MSC 114 or BSC 112.

Keys may be generated at any time, and are frequently generated at predetermined time intervals, for example once every hour. Periodic key generation minimizes the problem of a potential security breach, such as an unauthorized person discovering a private key. Keys could be generated upon request from a user of a WCD or other data device in communication system 100. Multiple key pairs could be generated, each key pair assigned to a unique BTS for use with WCDs within the respective coverage area of each BTS.

At some point in time after a key pair has been generated, a public key is transmitted to WCDs throughout communication system 100. The transmission may be accomplished at predetermined times (for example, upon expiration of a time), upon a request from data device within communication system 100, or by both methods. In one embodiment, the public key is transmitted to only a subset of data devices in communication system 100, for example, only to WCDs in the region of BTS 108, only WCDs in a certain base station sector, WCDs in one or more cities, etc. In another embodiment, the public key is transmitted to all communication devices throughout communication system 100.

In one embodiment, the public key transmitted from a BTS is transmitted on a paging channel found in many wireless communication systems. Generally, any WCD that is registered with communication system 100 will receive such a transmission. The public key may alternatively be transmitted using other known techniques, such as using the well-known Short Message Service, or SMS. After reception by a WCD, the public key is stored in an electronic memory contained within the WCD for use in encrypting subsequent transmissions from the WCD.

The public key may be digitally "signed" by a "trusted entity" using techniques well-known in the art to prevent "spoofing" the public key prior to transmission by a BTS. The trusted entity may be security manager 126, a service provider in charge of communication system 100, or any entity within communication system 100 tasked with generating the public key. The trusted entity is usually certified by an independent agency, such as Versign of Mountain View, California. After certification, the trusted entity then digiatally signs the public key using an authentication certificate given to it by the independent agency. Each WCD then authentication certificate given to it by the independent agency. Each WCD then authenticates the signed public key before use storing the key, again, using methods well known in the art.

In one embodiment, when a WCD desires to initiate a communication, it uses the stored public key to encrypt one or more initial communication messages, commonly known as an origination message, to a BTS. An origination message is a term that is used in the telecommunication industry to describe a request for initiating a communication. The initial message(s) may comprise a single message (such as an origination message), or the initial message(s) may comprise a series of messages, any one of which may contain identification and/or other characteristics of the WCD, such as position-related information pertaining to the location of the WCD, an identification of a target communication device, the type of communications desired (for example, secure voice, secure data, clear voice, clear data), and so on. WCD identification is presently accomplished by sending a numeric or alpha-numeric sequence which uniquely identifies the WCD within communication system 100. Typically, this identification comprises a mobile identification number (MIN), electronic serial number (ESN), international mobile subscriber identification (IMSI) number, or other unique identifier. The identification sequence is typically stored in a non-volatile memory within the WCD.

The initial message(s) may request one of a number of services available to the communication device. For example, the available services may include secure voice, secure data, clear voice, clear date, and so on. Various sub-categories of these services may also exist, such as packet data communications vs. asynchronous data communication system 100, but to keep the WCD's identification anonymous. Or, in the another embodiment, a non-secure voice communication could be established without compromising the originator's identity.

In another embodiment, the initial message(s) comprises the entire information to be transmitted. For example, it may be desirable to transmit a WCD's identity and position-related information all in the initial communication. Such a short communication could be accomplished using SMA or by using a signaling channel, such as a access channel. In this embodiment, resources do not have to be allocated by a BTS or by a MSC/BSC in response to the initial message(s).

In any case, the WCD encrypts the initial message using the stored public key prior to transmitting the initial message(s) to a BTS. This may involve encrypting only portions of the initial message(s), or it may involve encrypting all information contained within the initial message(s).

The encrypted initial message(s) is transmitted to one or more BTSs, where it is received and processed, either by the BTS or by another entity, such as MSC 114, or security manager 126. Processing comprises decrypting the initial message(s) using a private key corresponding to the public key that was used by the WCD to encrypt the initial message (s). Once the initial message(s) has been decrypted, resources may then be allocated to accommodate the requested communication service, such as secure voice, secure data, clear voice, or clear data. This generally comprises allocating communication equipment resources, such as a modulator/demodulator pair within one or more BTSs and/or allocating a switching circuit within MSC 114 to establish a communication link to a communication device through PSTN 116 or data network 118. In addition, a communication link is established with a target communication device as specified by the WCD initiating the communication. The target communication device can be any entity within communication system 10 and may be specified by the WCD in the initial message(s) or in a subsequent communication between the WCD and a BTS. A new key may be issued by security manager 126 and transmitted to the WCD and/or target communication device for subsequent communications.

Figure 2:
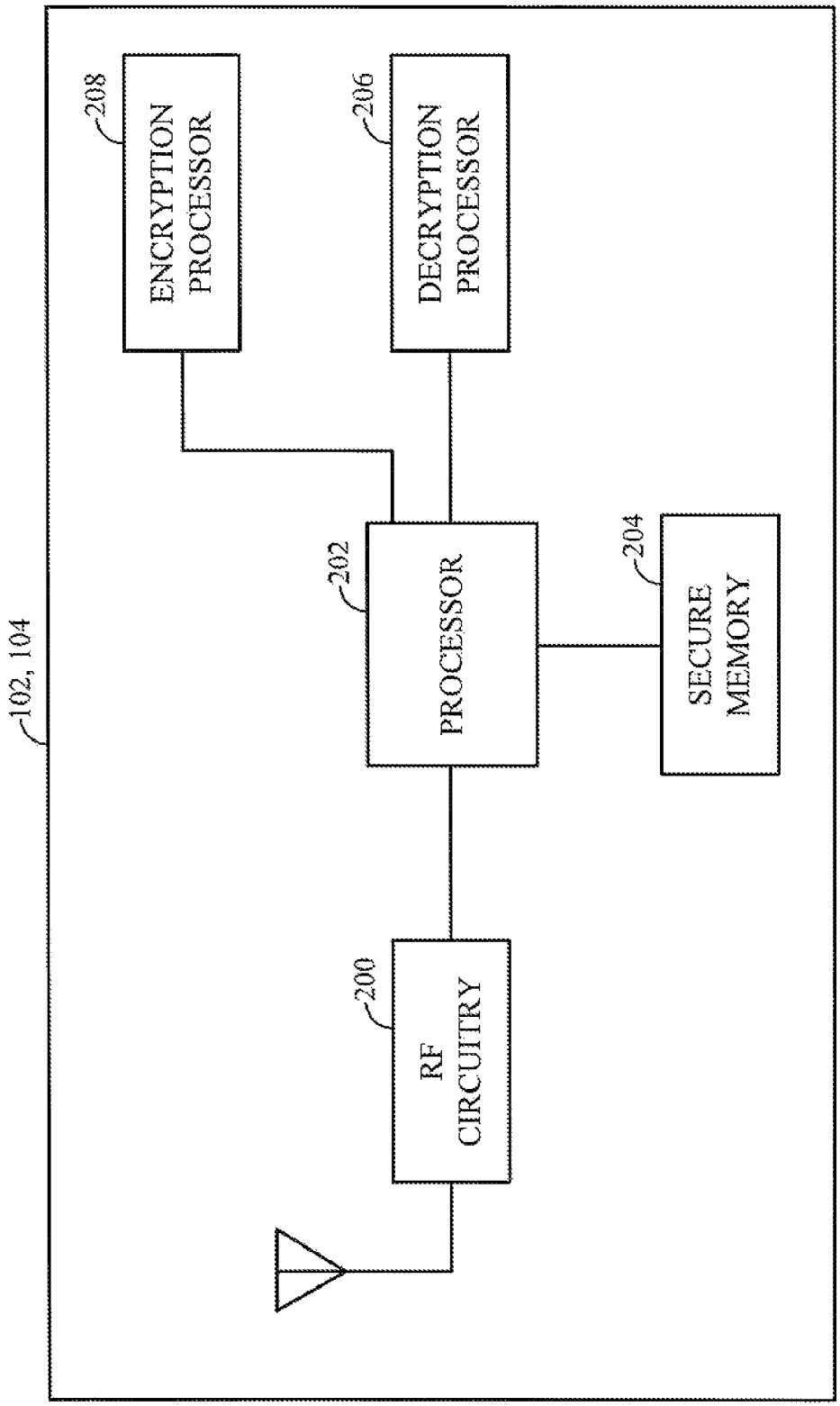
FIG. 2 illustrates a functional block diagram of a wireless communication device as used in one embodiment of the present invention.

FIG. 2 illustrates a functional block diagram of WCD 102 or WCD 104 as used in one embodiment of the present invention. Again, it should be understood that the components shown in FIG. 2 are not restricted to use in wireless communication devices but could be implemented in other devices, such as a landline telephone, laptop or desktop computer, etc. In this embodiment, WCD 102 is a wireless telephone capable of secure communications.

In any case, after a BTS has transmitted the public key, either signed or unsigned, it is received and downconverted using RF circuitry 200 using techniques suited for the applicable type of wireless communications, using techniques well-known in the art. FR circuitry comprises a transmitter and a receiver. The encrypted public key is identified by processor 202 and, if necessary, passed to decryption processor 206 for authentication if the public key was digitally signed. Then, the public key is stored in an electronic memory, shown as memory 204. Memory 204 comprises one of any number of known electronic storage devices, such as a random access memory (RAM), flash memory, EEPROM, etc.

When a user of WCD 102 desires to initiate a communication while keeping the WCD's identity and/or other characteristics private, the user initiates an action, such as pressing a sequence of keys on WCD 102, to begin establishing a communication link. In response to the user action, processor 202 generates one or more initial message(s) for transmission to a BTS. The initial message(s) informs communication system 100 of at least the identity of the requesting WCD (in this case WCD 102), and may additionally provide other information pertinent, such as the type of communication service desired, or position-related information pertaining to the location of the WCD. Position-related information may comprise latitude and longitude coordinates (or other coordinates), timing, or other measurements which would enable one to locate the WCD. The position-related information could alternatively, or in addition, comprise a landmark which is proximate to the WCD, such as the name of a city, building, river, bridge, street address, and so on. The identity of the WCD may comprise a mobile identification number (MIN), an electronic serial number (ESN), an International mobile subscriber identification (IMSI) number, or other numeric or alpha-numeric sequence for uniquely identifying a WCD within communication system 100. Either all or a portion of the information contained in the initial message(s) is encrypted using the public key stored in memory 204 in conjunction with encryption processor 208. Encryption processor 208 comprises electronic circuitry or a combination of hardware and software, for encrypting this information using the public key.

Once the initial message(s) is encrypted, it is modulated and upconverted using RG circuitry 200 and transmitted to a BTS. The encrypted initial message(s) is received by a BTS and is generally forwarded to an entity for decryption, such as BSC 112, MSC 114, or security manager 126. The entity decrypts the initial message(s) using a private key corresponding to the public key that was previously transmitted to WCDs and other communication devices within communication system 100. After the initial message(s) has been decrypted, resources may be allocated to establish the desired communication service, as previously described.

Figure 3:
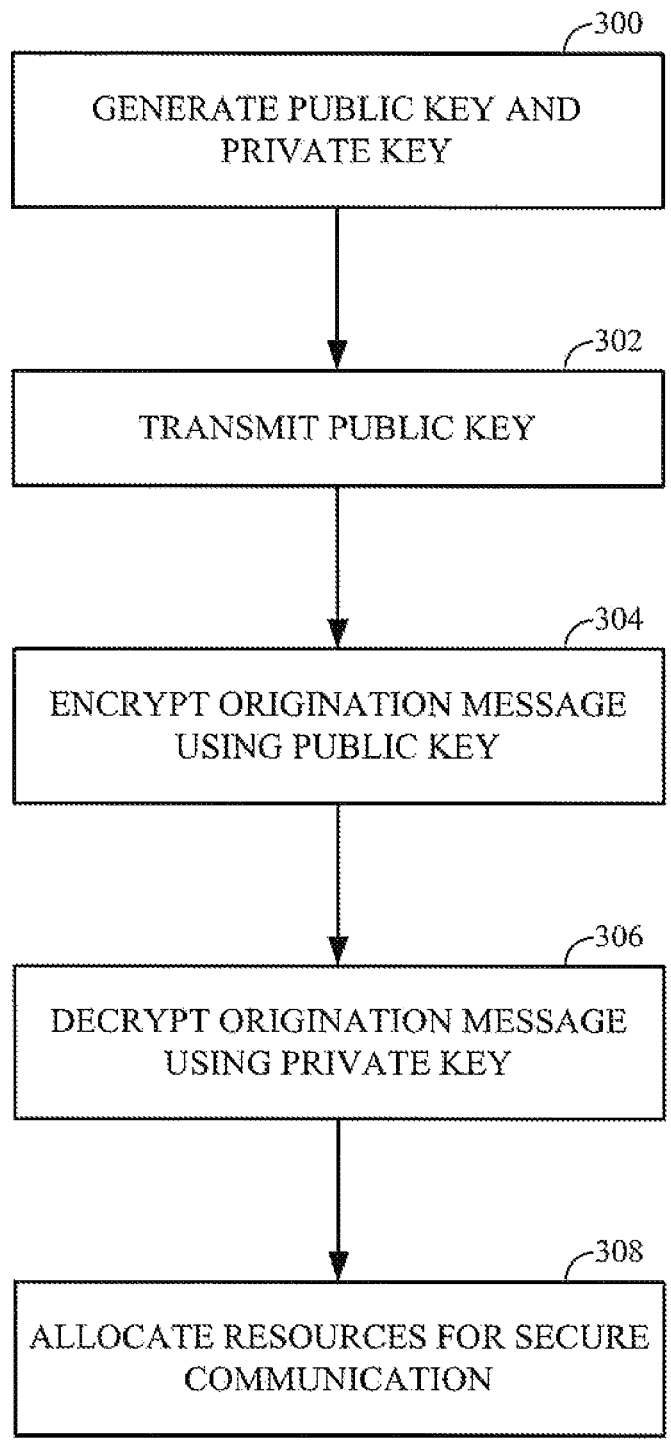
FIG. 3 is a flow diagram illustrating the method for providing privacy of user identity and characteristics in a secure communication system.

FIG. 3 is a flow diagram illustrating the method for providing privacy of user identity and characteristics in a communication system. In step 300, an entity within communication system 100 generates a key pair, namely a public key and a private key. At least the private key is stored in a secured memory, generally within the entity that generated it. The public key is then distributed to all or a subset of communication devices within communication system 100, shown as step 302. In one embodiment, the public key is digitally signed to ensure the authenticity of the source of the public key.

The public key is received by one or more communication devices within communication system 100 and stored in an electronic memory. When a communication is desired by a user of, for example, a wireless communication device, some or all information pertaining to one or more initial messages, such as an identification of the transmitting WCD, is encrypted using the public key stored in the memory of the wireless communication device, shown in FIG. 3 as step 304. The encrypted initial message(s) is then transmitted to a BTS.

The encrypted initial message(s) is then decrypted using the private key corresponding to the public key that was distributed to the communication devices of communication system 100. Once the initial message(s) has been decrypted, resources may be allocated to initiate and support a the desired communication servicesecure.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

The invention claimed is:

1. A basestation transceiver for providing privacy of user identity and characteristics in initiating a communication in a communication system, comprising:
    means for transmitting a public key to a plurality of wireless communication devices in wireless communication with only one sector of a plurality of sectors associated with the basestation transceiver, wherein the plurality of wireless communication devices includes a first communication device;
    means for receiving an initiation message from the first communication device, wherein at least a portion of the initiation message is encrypted using the public key, said initiation message being a request for initiating the communication in the communication system; and
    means for decrypting the encrypted portion of the initiation message using a private key corresponding to the public key.

2. A non-transitory processor-readable medium having one or more instructions for providing privacy of user identity and characteristics in initiating a communication in a communication system, which when executed by the processor causes the processor to:
    transmit a public key to a plurality of wireless communication devices in wireless communication with only one sector of a plurality of sectors associated with a basestation transceiver, wherein the plurality of wireless communication devices includes a first communication device;
    receive an initiation message from the first communication device, wherein at least a portion of the initiation message is encrypted using the public key, said initiation message being a request for initiating the communication in the communication system; and
    decrypt the encrypted portion of the initiation message using a private key corresponding to the public key.

3. A first communication device configured to request a communication in a communication system, comprising:
    means for receiving a public key from a basestation transceiver, wherein the basestation transceiver transmits the public key to a plurality of wireless communication devices in wireless communication with only one sector of a plurality of sectors associated with the basestation transceiver, wherein the plurality of wireless communication devices includes the first communication device; and
    means for transmitting an initiation message to the basestation transceiver, wherein at least a portion of the initiation message is encrypted using the public key, said initiation message being a request for initiating the communication in the communication system.

4. A non-transitory processor-readable medium having one or more instructions for requesting a communication in a communication system, which when executed by a processor causes the processor to:
    receive a public key at a first communication device from a basestation transceiver, wherein the basestation transceiver transmits the public key to a plurality of wireless communication devices in wireless communication with only one sector of a plurality of sectors associated with the basestation transceiver, wherein the plurality of wireless communication devices includes the first communication device; and
    transmit an initiation message from the first communication device to the basestation transceiver, wherein at least a portion of the initiation message is encrypted using the public key, said initiation message being a request for initiating the communication in the communication system.

5. The non-transitory processor-readable medium of claim 4, wherein the initiation message is an origination message and the encrypted portion of the initiation message comprises an identification of the first communication device.

6. An apparatus for providing privacy of user identity and characteristics in initiating a communication in a communication system, comprising:
    a transmitter operative to transmit data over the communication system; and
    a processor coupled to the transmitter and adapted to
        transmit a public key to a plurality of wireless communication devices in wireless communication with only one sector of a plurality of sectors associated with a basestation transceiver, wherein the plurality of wireless communication devices includes a first communication device,
        receive an initiation message from the first communication device, wherein at least a portion of the initiation message is encrypted using the public key, said initiation message being a request for initiating the communication in the communication system, and
        decrypt the encrypted portion of the initiation message using a private key corresponding to the public key.

7. A method operational at a basestation transceiver for providing privacy of user identity and characteristics in initiating a communication in a communication system, comprising:
    transmitting a public key to a plurality of wireless communication devices in wireless communication with only one sector of a plurality of sectors associated with the basestation transceiver, wherein the select subset includes a first communication device;
    receiving an initiation message from the first communication device, wherein at least a portion of the initiation message is encrypted using the public key, said initiation message being a request for initiating the communication in the communication system; and
    decrypting the encrypted portion of the initiation message using a private key corresponding to the public key.

8. The method of claim 7, wherein the initiation message is an origination message and the encrypted portion of the initiation message comprises an identification of the first communication device.

9. The method of claim 7, wherein the initiation message defines a request for a specific subset of communication services.

10. The method of claim 7, wherein the public key is transmitted at a predetermined event.

11. The method of claim 7, wherein the basestation transceiver generates the pubic key and the private key.

12. The method of claim 7, wherein the basestation transceiver transmits a second public key to a second communication device in wireless communication with another sector of the plurality of sectors associated with the basestation transceiver.

13. The method of claim 7, wherein the public key is transmitted to the first communication device on a paging channel associated with the basestation transceiver.

14. A first communication device configured to request a communication in a communication system, comprising:
   a radio frequency (RF) circuit operative to communicate over the communication system; and
   a processor coupled to the RF circuit and adapted to
      receive a public key from a basestation transceiver, wherein the basestation transceiver transmits the public key to a plurality of wireless communication devices in wireless communication with only one sector of a plurality of sectors associated with the basestation transceiver, wherein the plurality of wireless communication devices includes the first communication device; and
      transmit an initiation message to the basestation transceiver, wherein at least a portion of the initiation message is encrypted using the public key, said initiation message being a request for initiating the a-communication in the communication system.

15. A method operational at a first communication device for requesting a communication in a communication system, the method comprising:
   receiving a public key from a basestation transceiver, wherein the basestation transceiver transmits the public key to a plurality of wireless communication devices in wireless communication with only one sector of a plurality of sectors associated with the basestation transceiver, wherein the plurality of wireless communication devices includes the first communication device; and
   transmitting an initiation message to the basestation transceiver, wherein at least a portion of the initiation message is encrypted using the public key, said initiation message being a request for initiating the communication in the communication system.

16. The method of claim 15, wherein the initiation message defines a request for a specific subset of communication services.

17. The method of claim 15, wherein the initiation message is an origination message and the encrypted portion of the initiation message comprises an identification of the first communication device.

18. The method of claim 15, wherein the basestation transceiver generates the pubic key and a private key corresponding to the public key.

19. The method of claim 15, wherein the first communication device receives the public key on a paging channel associated with the basestation transceiver.

20. The method of claim 15, wherein the basestation transceiver transmits a second public key to a second communication device in wireless communication with another sector of the plurality of sectors associated with the basestation transceiver.

* * * * *